Patented Sept. 6, 1938

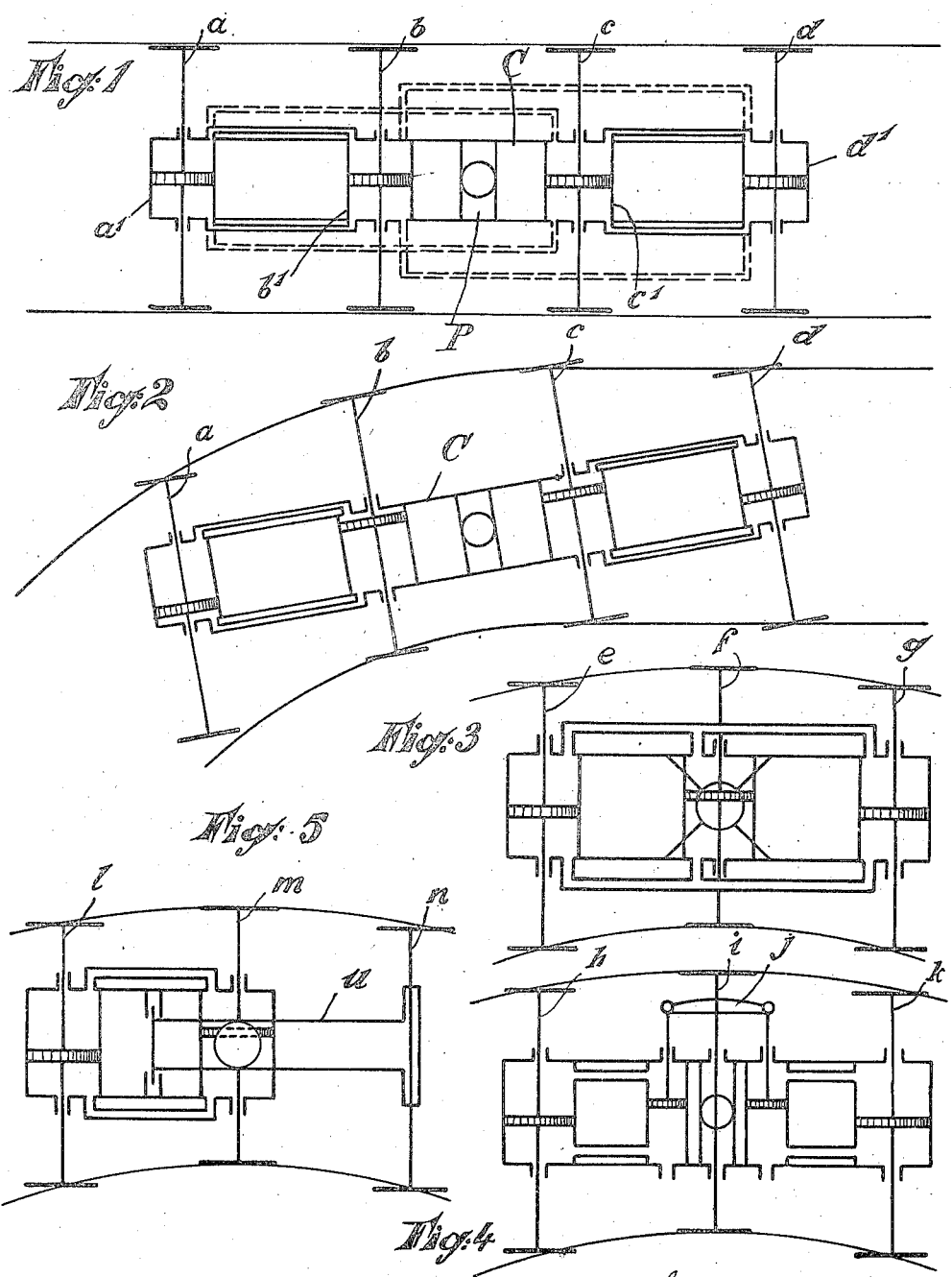

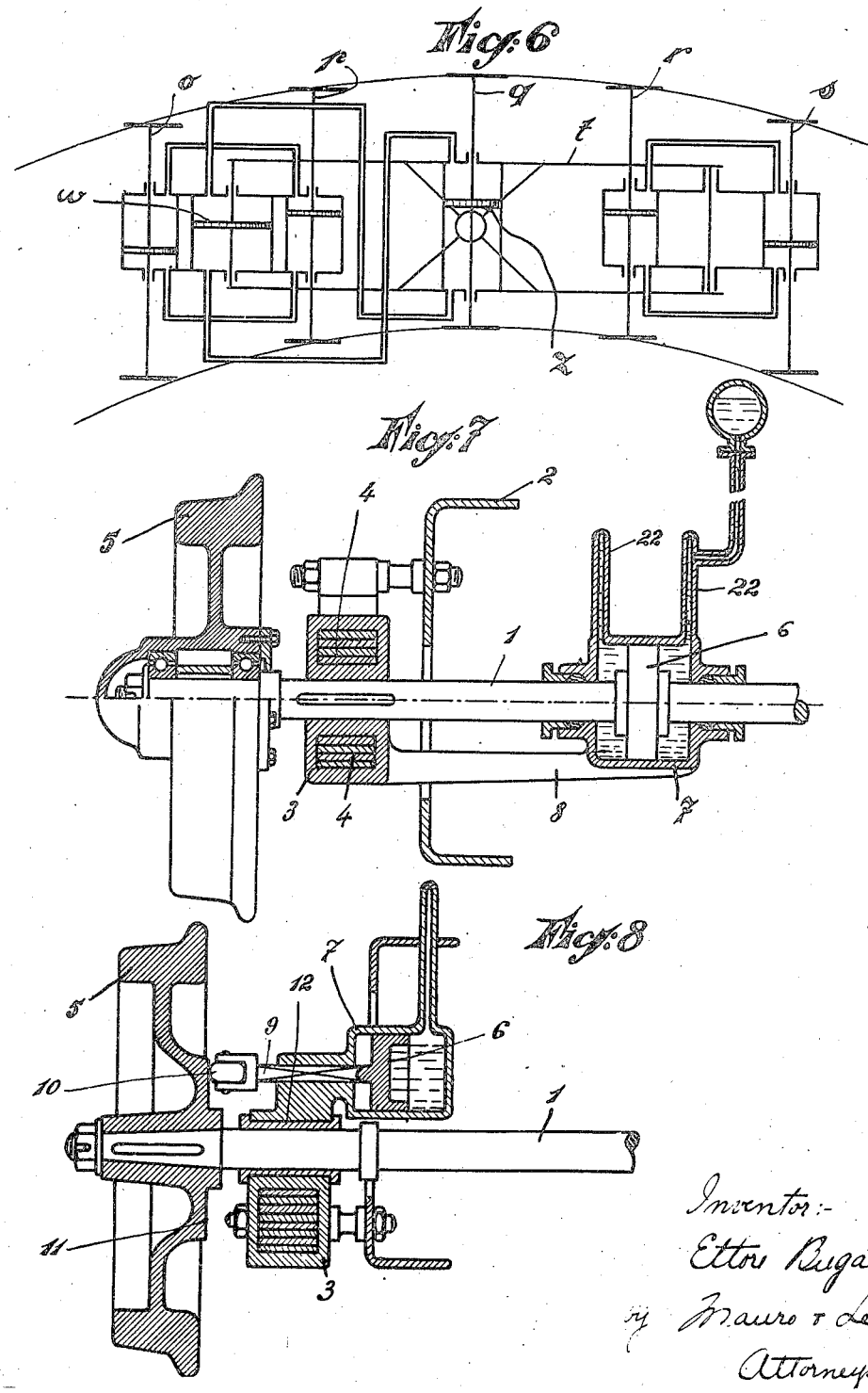

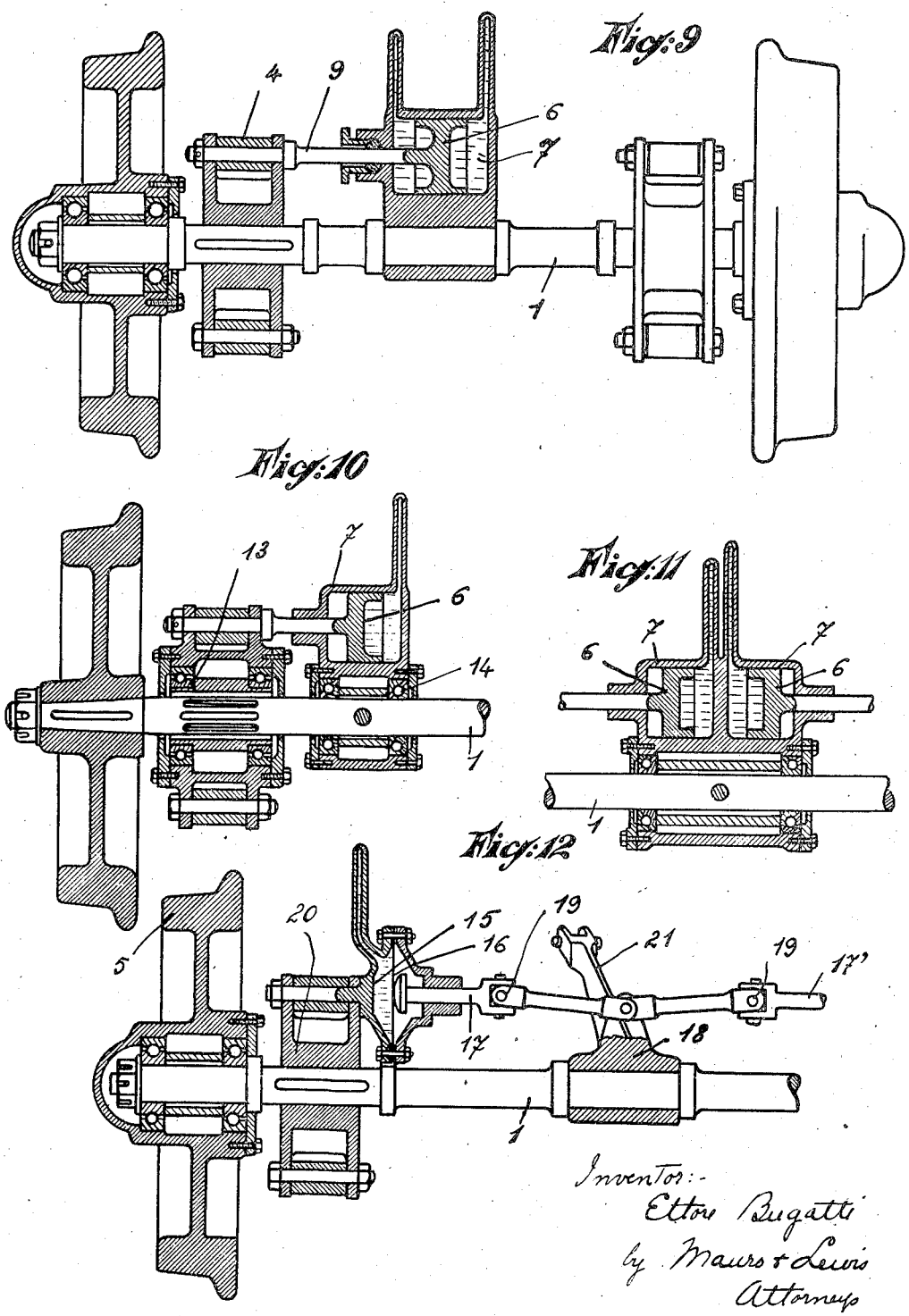

2,129,405

UNITED STATES PATENT OFFICE 2,129,405

TRUCK AND WHEEL TRAIN ESPECIALLY INTENDED FOR RAILROAD VEHICLES

Ettore Bugatti, Molsheim, France

Application May 26, 1936, Serial No. 81,934
In France June 3, 1935

5 Claims. (Cl. 105—171)

In order to enable the wheel trains and the trucks of railway vehicles to adequately take the curves of a railway track, several axles, or even all the axles, are allowed, in certain cases, to take limited displacements in the direction of their axes, that is to say displacements transverse to the direction of the track. Thus, in three-axle vehicles, or in three-axle trucks, it is customary to provide a play between the journal boxes of the intermediate axle and the pedestal jaws between which these boxes are adapted to move vertically.

In my U. S. Patent No. 2,089,110 dated August 3, 1937, I have described and claimed a system for interconnecting the axles of a multiple axle truck to one another in such manner that, in a curve, the axles are imperatively compelled to remain parallel. For instance the axles may form, by pairs, together with longitudinal springs pivotally connected to the frame of the truck, jointed parallelograms the deformations of which are limited by stops. With arrangements of this kind, the springs that are considered are called upon to perform several functions, and especially that of imparting to one axle a lateral displacement with respect to the frame of the truck or conversely when the other axle of the group of axles interconnected by the springs in question is moved laterally, that is to say in the transverse direction. In some cases, it may be desirable to relieve the suspension springs of performing the last mentioned function, which is all the more difficult to carry out when the vehicle is running at a higher speed, and consequently, the effects of the centrifugal force, in curves, are more important.

The object of the present invention is to provide a device which permits of obtaining this result but which is not limited exclusively to the particular trucks just above mentioned. This device can be applied whenever an axle must impart to another axle a lateral displacement with respect to the frame of the vehicle or of the truck or wheel train.

The essential feature of the present invention consists in interconnecting two axles or more than two axles through hydraulic means employing a fluid which is incompressible or little compressible, in such manner that, to a lateral displacement of one of these axles, there corresponds predetermined lateral displacement or displacements of the other axle or axles, respectively. This hydraulic connection does not exclude the use of mechanical connections combined therewith.

It will be readily understood that, owing to the connection that is thus provided, the suspension springs can be relieved from the funcion they had to assume as sides of the deformable parallelogram above mentioned.

Another advantage resulting from this system of connection between the axles consists in the fact that, to a lateral displacement of the axles, there corresponds a movement of liquid which involves a certain resistance to the flow of the liquid, which resistance can be modified by increasing or restricting the sections of the passages for the liquid. It is even possible, and this is an interesting feature of the present invention, to provide means for adjusting these sections of flow so as to obtain a truck the deformability of which within the permitted limits can be more or less reduced according to the working conditions. The resistance to the deformations of the truck, or, more generally, of the wheel train, is an obstacle to nosing movements. This results from the fact that, when, for instance, the front wheel on the right hand side strikes through its flange the rails on the right hand side, the shock that results therefrom produces a slight displacement of the front axle laterally toward the left hand side and therefore a corresponding but opposed displacement of the axle or axles hydraulically coupled therewith. Due to the resistance to the flow of the liquid, this situation does not disappear immediately, but everything takes place as if the transverse spacing of the wheels of the truck had increased that is to say as if wheel flanges fitted exactly between the two series of rails. Therefore nosing displacements of the truck are no longer possible.

Of course, the hydraulic coupling of the axles shall be obtained by making use of a liquid which is not liable to change its state, for instance to freeze, within the range of temperatures prevailing in use. In order to avoid the drawbacks that might result from expansion or contraction of the liquid, it is generally advantageous to adjoin compensating reservoirs, for instance of the bellows type, gas reservoirs, etc., to the system according to the invention. I may also fit the hydraulic coupling device with return devices, for instance springs intended to urge the axles toward their normal position.

The stops or other means provided for limiting the transverse displacements of the axles to the maximum value imposed thereon in curves of very small radius can advantageously be combined with the hydraulic coupling device. For instance, I may, as hereinafter explained, arrange the device in such manner that, at the end of the maximum permissible stroke, an axle causes a certain amount of liquid to be imprisoned in a closed chamber, this mass of liquid then playing the part of an incompressible block preventing any further displacement.

The invention can be carried out practically in various forms. In a general way, I associate with each axle or each wheel one or several chambers capable of containing liquid and a wall of which is movable in response to variations of the amount of liquid present in the chamber. For instance the chamber is given the form of a cylinder containing a piston, hydraulic bellows, a box with a membrane, and so on. Between the various chambers I provide, for instance by means of pipes, the desired connections, as it will be hereinafter described for some specific examples. This system of pipe may, if needed, be combined with mechanical transmission devices. They may also be fitted with devices for compensating for expansion of the liquid. These devices may also, either as a modification or as supplementary arrangement, be fitted directly on the chambers themselves.

These chambers may be mounted in such manner as to be supported by the frame or by a part connected thereto in such manner as to act on the corresponding axle or wheel. The reverse arrangement could also be employed.

My invention further includes the construction of complex wheel trains or trucks in which one or more groups of axles or elementary trucks are adapted to move as a whole in the transverse direction with respect to the axles or elementary trucks or with respect to the frame of the vehicle or of the wheel train, the displacements being controlled in accordance with the displacements of the other axles or trucks or inversely, through hydraulic connections. Preferably, the elementary trucks are of the type including hydraulic connections.

Other features of the present invention will result from the following detailed description of some specific embodiments thereof.

Preferred embodiments of the present invention will be hereinafter described, with reference to the accompanying drawings, given merely by way of example, and in which:

Fig. 1 is a diagram of the hydraulic connections which may be provided between the axles of a truck including eight wheels;

Fig. 2 is an analogous view showing the same truck running along a curved portion of the track;

Figs. 3 to 6 are analogous diagrammatical views corresponding to trucks having three and five axles;

Fig. 7 diagrammatically shows, in transverse sectional view, one half of an axle and of the hydraulic device associated therewith;

Figs. 8 to 12 are similar views showing other embodiments;

Figs. 1 to 6 have a purely diagrammatic character and, in these figures, the curvature of the track was greatly exaggerated so as to better illustrate the characteristics of the invention.

The truck shown in Fig. 1 includes four axles $a, b, c, d$ capable of moving transversely, within certain limits, with respect to the frame designated by reference character C. This frame C is connected to the vehicle through the usual pivot or king-bolt designated by reference character P. In order to simplify the disclosure it has been supposed that the axles are of the unsuspended type, that the pistons of the hydraulic cylinders $a_1, b_1, c_1, d_1$ are rigid with axles $a, b, c, d$ and that these cylinders $a_1, b_1, c_1, d_1$ are rigid with the rigid frame C. As shown in solid lines in the drawings, cylinders $a_1, b_1$, same as cylinders $c_1, d_1$ communicate together on either side of the corresponding pistons. Under these conditions (Fig. 2), when for instance axle $a$ moves toward the left hand side with respect to frame C, the axle $b$ moves toward the right hand side and the displacements are the same if the cylinders are supposed to be equal. The same is true for axles $c, d$. It is also possible to connect the cylinders as shown by the dotted lines of Fig. 1. In this case, at any time, the displacements of axle $a$ are equal in magnitude to the displacements of axle $c$ but take place in the opposite direction and the same is true for the displacements of axles $b$ and $d$.

It is also possible, as shown by Fig. 3, to arrange in parallel relation the cylinders corresponding to the respective axles, for instance the axles $e, f, g$ of a six-wheeled truck. To a transverse displacement of axle $e$ there correspond displacements of axles $f, g$ which are such that the sums of the volumes of the chambers limited on the same side of the pistons remain constant.

In the truck shown by Fig. 4, which includes three axles $h, i, k$, the central axle $i$ is connected, through a bar $j$ rigidly fixed thereto, to the pistons of two cylinders the sectional areas of which are equal to one half of the sectional areas of the cylinders corresponding to axles $h$ and $k$ respectively.

The truck with three axles $l, m, n$ shown in Fig. 5 includes only two hydraulic cylinders connected together as in the case of axles $a$ and $b$ of Fig. 1, but the frame of the elementary truck thus formed is connected to axle $n$ through an equalizer frame $u$ which also ensures the distribution of the loads to the axles.

The truck or wheel train of Fig. 6 includes five axles designated by reference characters $o, p, q, r, s$ and a main frame $t$, which may be the frame of the vehicle. In the example illustrated by this figure, it has been supposed that, on the one hand axles $o$ and $p$, and on the other hand axles $r$ and $s$, constitute two elementary trucks forming two deformable parallelograms at the ends of frame $t$. It has been further supposed that axle $q$, movable transversely with respect to frame $t$, positively controls the displacements of the whole of elementary truck $o, p$ transversely to frame $t$ or inversely. According to the diagram, the piston $w$, connected to frame $t$, is of a section larger than that of piston Z connected to the intermediate axle $q$, and the connections between the cylinders are crossed in such manner that, to a transverse displacement of axle $q$ there corresponds a displacement of truck $o, p$ in the opposite direction, but with a smaller amplitude.

The above diagrams have been given merely in order to illustrate the possibilities of the system according to the present invention. Of course they might be modified, either by providing different connections or by combining some of the distinct connections above described, without departing from the principle of the invention.

I will now describe some embodiments of the present invention adapted to be used in actual practice.

In the case of Fig. 7, the axle I can slide transversely with respect to the frame 2, which is either the frame of the truck or wheel train or the chassis of the vehicle. For this purpose, the axle 1 is guided in the strap 3 of the suspension springs 4. The wheels, such for instance as wheel 5, are rotatably journaled on said axle. The axle carries, for instance in its middle part, a piston 6 capable of moving in a cylinder 7 which is supported by strap 3 through a bracket 8. Cylinder 7 is provided with conduits or pipes 22 leading to one or several cylinders analogous to cylinder 7 and associated with other axles.

It will be readily understood that, if axle 1 is caused to slide transversely, it drives liquid out of cylinder 7 through either of conduits 22 and thus controls, through connections devised as above explained, the displacement of one or several of the other axles. On the other hand, axle 1 can be imperatively moved in response to displacement of one or several of the other axles.

In order to limit the lateral displacement of the axle in one direction or the other with respect to the frame, I may make use, in the known manner, of stops, consisting for instance of collars carried by axle 1 and adapted to come into contact with parts rigid with the frame. In the present case, these stops may be combined with piston 6, their displacement being limited by the walls of cylinder 7. I may also dispose the conduits 22 on cylinder 7 in such manner that piston 6, after having moved a certain distance, covers the port which connects the corresponding conduit with cylinder 7. From this time on, the incompressible liquid shut off between the piston and one of the cylinder ends constitutes a very efficient stop.

In order to compensate for expansions or contractions as may occur in the liquid, I may provide, either on cylinder 7 or on conduits 22, compensating devices which may consist of small air reservoirs located at the upper part of the hydraulic transmission, in such manner that expansion of the liquid merely produces a compression of said air, without the pressure being unduly increased in the hydraulic system.

Fig. 8 shows a modification in which cylinder 7 is directly carried by the spring strap or by the grease box 12. In this case, piston 6 acts no longer upon the axle but upon wheel 5 through the medium of a rod 9 provided at its end with a roller 10 adapted to run along a roller track 11 provided on wheel 5.

This embodiment can be employed, for instance, when the wheel is fixed in a rigid manner on the revolving axle. It will be noted that, in this case, piston 6 is a single acting piston and that it is advisable to apply an analogous arrangement to the other wheel of axle 1.

Fig. 9 corresponds to the case of a dead (non-revolving) axle cooperating with a wheel adapted to turn freely thereon, this system coacting with a double acting piston and cylinder system. The rod 9 of piston 6 constitutes, in this particular case, the pin for fixation of suspension spring 4, engaging the eye thereof. As this spring cannot move transversely with respect to the truck frame or the frame of the wheel train (according as the case may be), the piston is itself stationary and the transverse displacements are effected by cylinder 7 or axle 1, which is rigidly connected therewith.

Fig. 10 shows an analogous embodiment in the case of a single acting piston and a live axle. It will be noted that bearings, such as ball bearings 13, and 14, are interposed between the axle on the one hand, and the shackle or the cylinder on the other hand. The axle can slide with respect to bearing 13 but not with respect to bearing 14 (which is preferably devised in such manner as to constitute a thrust bearing). In this case, it is advisable to make use of a similar arrangement for the other wheel corresponding to the axle that is considered, since piston 6 is of the single acting type. It is possible, in an embodiment analogous to that of Fig. 10, to group the cylinders such as 7 by making use of the construction illustrated by Fig. 11. It is also possible, by modifying the liquid inlet faces, to make use of a cylinder analogous to that of Fig. 9.

Fig. 12, which relates to the case of an axle 1 with respect to which wheel 5 can turn freely, shows a chamber 15 closed on one side by a membrane 16 and which constitutes the equivalent of the cylinders and pistons above described. Chamber 15 is connected to the frame and the transverse displacement of the axle is controlled by membrane 16. It should be noted that I have disclosed a single action hydraulic device, which calls for the presence of a similar device, on the other side of the axle, but I might also arrange the system in such manner that liquid is admitted on the other side of the membrane, in which case the hydraulic device would be of the double acting type. In a general manner, the membrane system disclosed by Fig. 12 might be substituted for any of the piston and cylinder devices above described.

In the specific embodiment of Fig. 12, membrane 16 acts upon a push rod 17, and the push-rods 17, 17' disposed on either side of the axle are connected to a central collar 18 fitted without transverse play on the axle 1 through Cardan joints 19 which permit relative warping of shackles such as shackle 20. A lever 21 connected to the truck frame keeps collar 18 in the correct position.

Of course, the invention is not limited to the specific embodiments above described and details of these embodiments could be used in connection with other arrangements based upon the same principle. For instance the cylinders adapted to cooperate with pistons, or the chamber shown in Fig. 12, could be replaced by hydraulic bellows. I might also provide means for returning the parts into their intermediate positions. Also it will be readily understood that the transmission might be of a partly hydraulic type since, for instance, a liquid connection, such for instance as that constituted by the liquid column interposed between two cylinders could be replaced by a rod forming a plunger piston at both ends.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a railway vehicle, the combination of a rigid frame, at least three transverse wheeled axles held in parallel spaced apart relation in said frame, relatively shiftable with respect to said frame in the transverse direction, and hydraulic means operatively interposed between the frame and the axles for causing a positive predetermined interdependence of the transverse shifting displacements of said axles with respect to said frame.

2. In a railway vehicle having a rigid longitudinal structure and at least three transverse wheeled axles held in parallel spaced apart relation in said frame, relatively shiftable in the transverse direction with respect to said frame, a device for equalizing the lateral centrifugal thrusts imparted to the axles when the vehicle is negotiating a curve which comprises a hydraulic pump operatively interposed between each axle and said frame, responsive to relative transverse displacements between the same, and at least one hydraulic line adapted to interconnect all the hydraulic pumps.

3. An eight wheel railway truck which comprises in combination a frame, leading and trailing couples of flanged wheel axles held in transverse parallel relation by said frame and transversely movable with respect thereto, and hydraulic means associated with each couple of axles for positively causing each axle in said couple to move transversely in response to a transverse movement of the other axle by the same amount but in opposite direction.

4. In a railway vehicle having two flanged wheel axles parallelly arranged for relative transverse displacements in a longitudinal rigid structure, a hydraulic cylinder and piston pump interposed between each axle and the structure, one member of which is rigid with the axle while the other member is rigid with the structure, said cylinder having a side port adapted to be covered by said piston; and a hydraulic line running from the side port of one of the hydraulic pumps to the side port of the other hydraulic pump, said line having a liquid tight connection with each pump cylinder; whereby the transverse displacements of the axles are rendered interdependent and are individually limited.

5. In a railway vehicle having two flanged wheel axles parallelly arranged for relative transverse displacements in a longitudinal rigid structure, a hydraulic cylinder and piston pump interposed between each axle and the structure, one member of which is held against longitudinal movement relative to the axle while the other member is held against longitudinal movement relative to the structure, said cylinder having a port adapted to be covered by said piston; and a hydraulic line running from the side port of one of the hydraulic pumps to the side port of the other hydraulic pump, said line having a liquid tight connection with each pump cylinder; whereby the transverse displacements of the axles are rendered interdependent and are individually limited.

ETTORE BUGATTI.